United States Patent
Kim et al.

(10) Patent No.: US 9,878,575 B2
(45) Date of Patent: Jan. 30, 2018

(54) WHEEL FOR VEHICLES AND METHOD FOR MANUFACTURING THE SAME

(71) Applicants: Hyundai Motor Company, Seoul (KR); Kia Motors Corporation, Seoul (KR)

(72) Inventors: Sang Rak Kim, Seoul (KR); Min Jwa Seo, Uiwang-si (KR); Yong Min Jang, Gyeongsan-si (KR); Su Ji Baek, Yeongcheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/954,764

(22) Filed: Nov. 30, 2015

(65) Prior Publication Data

US 2016/0303895 A1 Oct. 20, 2016

(30) Foreign Application Priority Data

Apr. 16, 2015 (KR) .................. 10-2015-0053541

(51) Int. Cl.
*B60B 1/14* (2006.01)
*B60B 3/10* (2006.01)
*B60B 3/04* (2006.01)

(52) U.S. Cl.
CPC ............. *B60B 3/10* (2013.01); *B60B 3/041* (2013.01); *B60B 2310/302* (2013.01); *B60B 2900/133* (2013.01); *B60B 2900/311* (2013.01)

(58) Field of Classification Search
CPC ..... B60B 3/10; B60B 3/041; B60B 2310/302; B60B 2900/133; B60B 2900/311
USPC ........... 301/63.101, 63.103, 63.106, 63.107, 301/63.108, 63.704, 64.101, 64.107
See application file for complete search history.

(56) References Cited

U.S. PATENT DOCUMENTS

| 7,895,752 B2 * | 3/2011 | Sano | B21D 53/268 29/894.32 |
| 8,596,726 B2 * | 12/2013 | Kondo | B60B 3/007 301/63.103 |
| 8,646,851 B2 * | 2/2014 | Kihara | B60B 3/007 301/63.103 |
| 2010/0253134 A1 * | 10/2010 | Sano | B21D 53/268 301/104 |

(Continued)

FOREIGN PATENT DOCUMENTS

| EP | 1 348 578 A2 | 10/2003 |
| JP | 10-109501 A | 4/1998 |
| JP | 2001-71706 A | 3/2001 |

(Continued)

*Primary Examiner* — S. Joseph Morano
*Assistant Examiner* — Jean Charleston
(74) *Attorney, Agent, or Firm* — Morgan, Lewis & Bockius LLP

(57) ABSTRACT

A wheel for vehicles may include a rim coupled to a tire, and a spoke-shaped disc including a spoke and a vent hole, the spoke-shaped disc being coupled to a side surface of the rim to support the rim, in which a coupling zone between the spoke of the spoke-shaped disc and the rim and a coupling zone between a portion of the spoke-shaped disc formed with the vent hole and the rim have a height difference in a wheel axis direction, to allow the spoke-shaped disc to support the rim at an interior and an exterior of the rim.

4 Claims, 4 Drawing Sheets

(56) References Cited

U.S. PATENT DOCUMENTS

2013/0140874 A1    6/2013  Fukaya

FOREIGN PATENT DOCUMENTS

| JP | 2010-241413 A | 10/2010 |
| JP | 5057602 B2 | 10/2012 |
| KR | 10-2013-0044465 A | 5/2013 |
| KR | 10-2013-0052456 A | 5/2013 |
| WO | WO 2009/051229 A1 | 4/2009 |

* cited by examiner (STEEL WHEEL RIM MODE VIBRATION)

WHEEL FOR VEHICLES AND METHOD FOR MANUFACTURING THE SAME

CROSS-REFERENCE TO RELATED APPLICATION

The present application claims priority to Korean Patent Application No. 10-2015-0053541 filed Apr. 16, 2015, the entire contents of which is incorporated herein for all purposes by this reference.

BACKGROUND OF THE INVENTION

Field of the Invention

The present invention relates to a wheel for vehicles and a method for manufacturing the same. More particularly, it relates to a wheel for vehicles which is capable of achieving superior design to a general steel wheel owing to design freedom obtained by a spoke-shaped disc, of achieving an increased natural frequency and rigidity while having the same level of a disc thickness and weight as the general steel wheel, and of achieving road noise reduction performance, and a method for manufacturing the same.

Description of Related Art

Recently, increased vehicle fuel efficiency and reduced noise during traveling have been demanded by vehicle users. In particular, advanced users prefer vehicles providing a more comfortable and low noise cabin.

Road noise of a real vehicle may be broadly divided into resonance noise, booming noise, and rumble noise. Thereamong, resonance noise is introduced to a vehicle cabin as vibration applied from a road surface during traveling is transmitted to, for example, tires, wheels, chassis components, and a vehicle body.

Various specifications of wheels for vehicles have been developed to improve road noise.

Generally, wheels for vehicles may be divided into steel wheels formed of steel and aluminum wheels formed of an aluminum alloy.

FIG. 1A is a view illustrating a conventional general steel wheel for vehicles, and FIG. 1B is a view illustrating a conventional aluminum wheel.

The steel wheel is manufactured by bonding a steel rim 1 and a disc 2 to each other via welding and has advantages of low price and easy manufacture. However, the steel wheel is inferior in design and heavier as compared to an aluminum wheel due to characteristics of steel and a processing method including welding.

The aluminum wheel is manufactured using an aluminum alloy without welding such that a rim 1 and spokes 3 are integrally formed. The aluminum wheel has advantages including superior design and marketability and light weight, but also has disadvantages including low productivity and high price due to characteristics of an aluminum alloy and a complicated processing method.

In recent years, to improve design of a conventional general steel wheel, a styled steel wheel having a spoke-shaped disc similar to an aluminum wheel has been developed. This styled steel wheel increases marketability of a vehicle through improvement in wheel design.

Prior art discloses a wheel for vehicles in which a rim is formed of steel and a disc is formed of an aluminum alloy for improvement of design, and a styled steel wheel which is manufactured by welding a spoke-shaped disc having spokes and decorative holes (or vent holes) to a rim.

In addition, prior art discloses an aluminum wheel for vehicles which includes a rim consisting of a cylindrical base rim configured to face the tread of a tire and a support rim integrally protruding from an outer surface of the base rim in the circumferential direction of the base rim, the support rim and the base rim having a hollow region interposed therebetween.

The aluminum wheel having the hollow region is capable of absorbing and reducing resonance noise generated from the tire via the hollow region of the rim even if a separate sound absorption material is not used, thereby advantageously reducing noise to be transmitted to a vehicle cabin.

Meanwhile, FIG. 2 illustrates vibration in a steel wheel rim mode. A general steel wheel is known as generating greater road noise by about 2 dB to 3 dB as compared to an aluminum wheel. This is because the natural frequency of the steel wheel rim mode is within a range of 170 Hz to 200 Hz that is greatly lower than that (within a range of 300 Hz or more) of an aluminum wheel.

The aforementioned styled steel wheel may increase the natural frequency owing to design freedom as to the structure and shape of a disc supporting a rim, which may cause performance improvement in terms of design and road noise.

However, the styled steel wheel needs to increase a disc thickness in order to achieve a high natural frequency and such a thicker disc than that of a conventional wheel causes an excessive wheel weight.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a wheel for vehicles which is capable of achieving superior design to a general steel wheel owing to design freedom obtained by a spoke-shaped disc, of achieving an increased natural frequency and rigidity while having the same level of a disc thickness and weight as the general steel wheel, and of achieving road noise reduction performance, and a method for manufacturing the same.

According to various aspects of the present invention, a wheel for vehicles may include a rim coupled to a tire, and a spoke-shaped disc including a spoke and a vent hole, the spoke-shaped disc being coupled to a side surface of the rim to support the rim, in which a coupling zone between the spoke of the spoke-shaped disc and the rim and a coupling zone between a portion of the spoke-shaped disc formed with the vent hole and the rim may have a height difference in a wheel axis direction, to allow the spoke-shaped disc to support the rim at an interior and an exterior of the rim.

An end of the spoke of a peripheral portion of the spoke-shaped disc may be coupled to an exterior position of the rim, and a vent hole position end, corresponding to an end of the portion formed with the vent hole, of the peripheral portion of the spoke-shaped disc may be coupled to an interior position of the rim.

An end of the spoke and the portion formed with the vent hole may be coupled, via welding, to positions of the rim having a height difference in the wheel axis direction.

According to various aspects of the present invention, a method for manufacturing a wheel for vehicles may include forming a rim configured to be coupled to a tire and a spoke-shaped disc including a spoke and a vent hole, and coupling the spoke-shaped disc to a side surface of the rim such that a coupling zone between the spoke of the spoke-shaped disc and the rim and a coupling zone between a portion of the spoke-shaped disc formed with the vent hole and the rim have a height difference in a wheel axis direction, to allow the spoke-shaped disc to support the rim at an interior and an exterior of the rim.

After the rim is formed of steel and the spoke-shaped disc is formed by pressing a steel panel, the rim and the spoke-shaped disc may be coupled to each other to complete a styled steel wheel.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
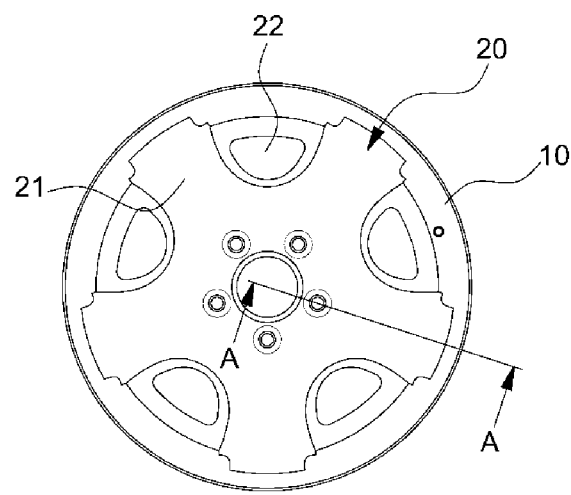
FIG. 3 is a front view illustrating an exemplary wheel for vehicles according to the present invention.
Figure 4:
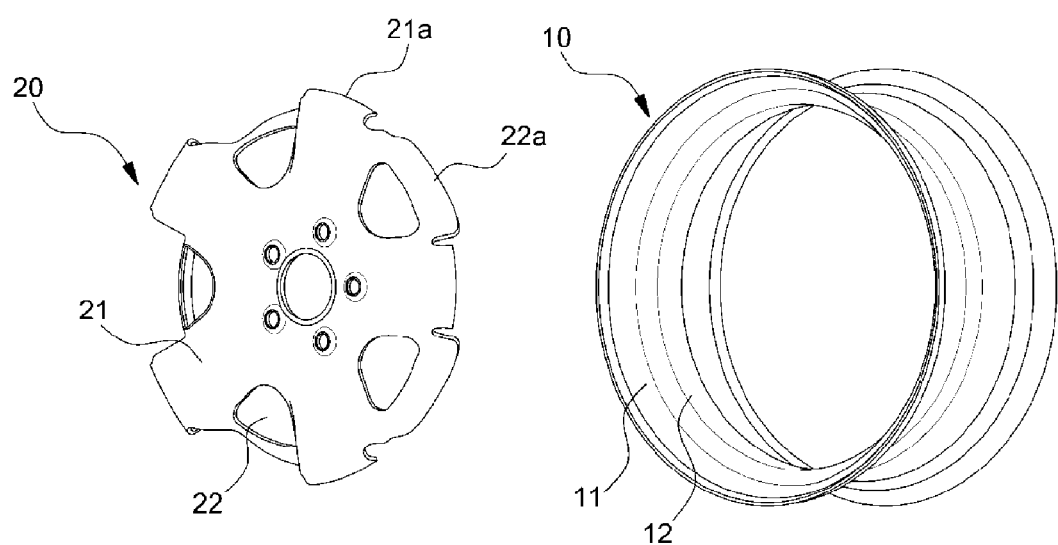
FIG. 4 is an exploded perspective view illustrating a configuration of the exemplary wheel for vehicles according to the present invention.

FIG. 3 is a front view illustrating a wheel for vehicles according to various embodiments of the present invention, and FIG. 4 is an exploded perspective view illustrating a configuration of the wheel for vehicles according to various embodiments of the present invention in a separated state of a rim and a spoke-shaped disc before bonding.

Figure 5:
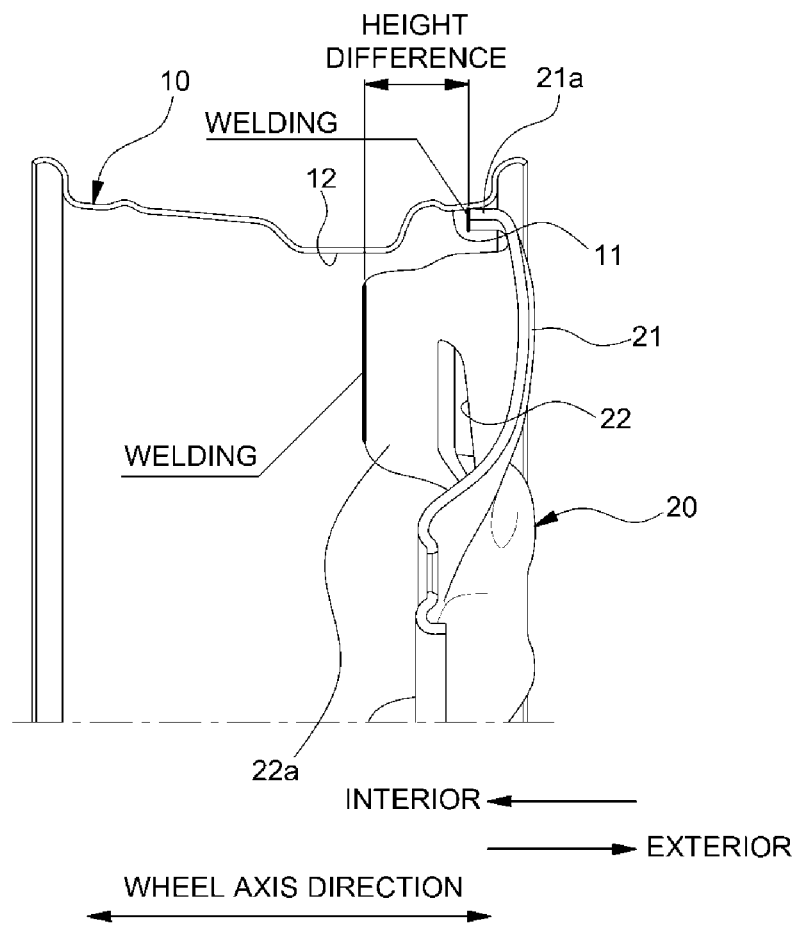
FIG. 5 is a sectional view taken along line "A-A" of FIG. 3.

FIG. 5 is a sectional view taken along line "A-A" of FIG. 3.

The wheel for vehicles according to various embodiments of the present invention is a styled steel wheel formed of steel. The wheel for vehicles includes a rim 10 configured to be coupled to a tire and a spoke-shaped disc 20 bonded to the side surface of the rim 10 via welding to support the rim 10, the spoke-shaped disc 20 being formed by pressing a single panel.

The spoke-shaped disc 20 is formed with spokes 21 and vent holes (or decorative holes) 22. In the disc 20, ends 21a of the spokes 21 and ends 22 of positions formed with the vent holes 22 become weld zones between the disc 20 and the rim 10.

That is, weld zones between the spoke-shaped disc 20 and the rim 10 include the ends 21a of the spokes 21 and the ends 22a of portions formed with the vent holes 22. In the following description, the ends 22a, which are peripheral portions of the disc 20 formed with the vent holes 22, are referred to as vent hole position ends.

In addition, the wheel for vehicles according to the present invention has a feature of bonding and weld zones between the rim 10 and the spoke-shaped disc 20. More specifically, as illustrated in FIG. 5, a main feature of the present invention is that the end 21a of each spoke 21 and each vent hole position end 22a, which are weld zones between the disc 20 and the rim 10, have a height difference in the axial direction about a wheel axis (hereinafter referred to as a "wheel axis direction").

Accordingly, positions of the rim 10 to which the disc 20 is welded, i.e. a position to which the end 21a of each spoke 21 is welded and a position to which each vent hole position end 22a is welded also have a height difference in the wheel axis direction. Weld zones between the rim 10 and the disc 20 are divided into an interior weld zone and an exterior weld zone when viewed from the front side of the rim 10.

In various embodiments, the end 21a of each spoke 21 may be welded to an exterior position of the rim 10 (the right position of FIG. 5) and each vent hole position end 22a may be welded to an interior position of the rim 10 (the left position of FIG. 5). In other words, a position of the rim 10 where the end 21a of each spoke 21 is welded is an exterior position and a position of the rim 10 where each vent hole position end 22a is welded is an interior position.

As the weld zones between the rim 10 and the disc 20, i.e. the spokes 21a and the portions formed with the vent holes 22 have a height difference in the wheel axis direction, the disc 20 is capable of supporting the rim 10 in a wide range at the interior and the exterior of the rim 10.

That is, in the styled steel wheel manufactured by bonding the rim 10 and the spoke-shaped disc 20 to each other via welding, as the weld zone between the end 21a of each spoke 21 and the rim 10 and the weld zone between each vent hole position end 22a and the rim 10 have a height difference in the wheel axis direction, the disc 20 is capable of supporting the rim 10 in a wide range at the interior and the exterior of the rim 10, which increases the natural frequency and rigidity of the wheel.

In a conventional styled steel wheel, a spoke-shaped disc is formed with a ring-shaped peripheral portion to be welded to the rim. At this time, the peripheral portion as a weld zone (weld line) between the rim and the disc has a circular shape following the circumferential direction of the wheel.

Differently from the conventional styled steel wheel as described above which has a 2-dimensional circular weld line between the rim and the disc, in the wheel of the present invention, the weld zones between the rim 10 and the disc 20 are not interconnected via a single line and, at this time, the weld zones have 3-dimensional arrangement in which the spokes 21 and the portions formed with the vent holes 22 have a height difference in the wheel axis direction along the periphery of the disc 20.

Figure 1A:
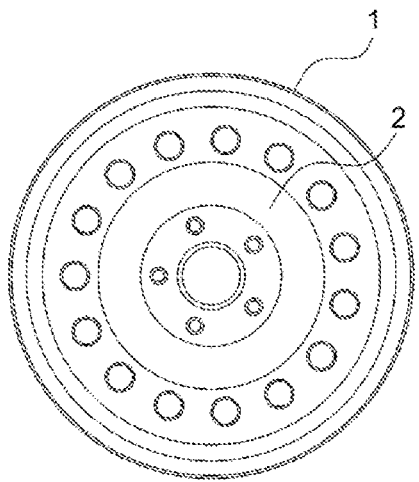
FIG. 1A and FIG. 1B is a view illustrating a conventional wheel for vehicles according to the related art.
Figure 1B:
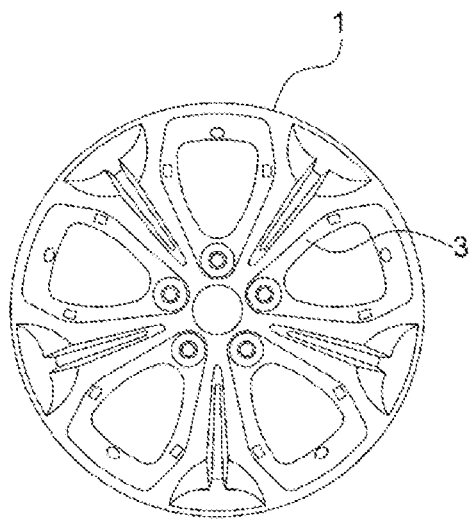
Figure 2:
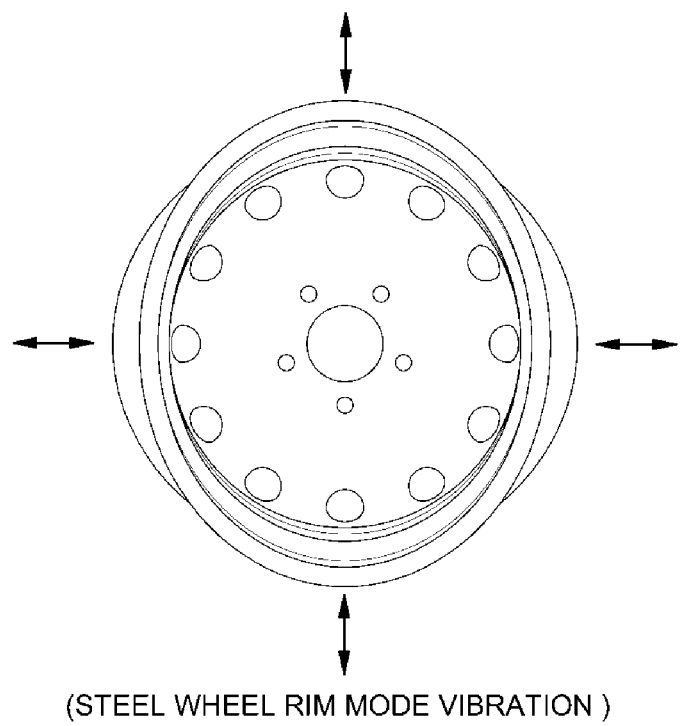
FIG. 2 is a view illustrating vibration in a steel wheel rim mode according to the related art.

In conclusion, as the disc 20 supports the interior and the exterior of the rim 10, the natural frequency and the effective rim rigidity of the wheel may be considerably increased as compared to the conventional general steel wheel (see FIG. 1A).

The present invention analyzed factors that contribute to the natural frequency of the wheel for vehicles in a low frequency primary mode, i.e. in a rim mode using a phase optimization design technique and confirmed that a height difference between a rim-spoke bonding zone and a rim-vent hole position end bonding zone is a major factor that contributes to the natural frequency of the wheel in the rim mode.

In particular, it was confirmed that, as the disc 20 supports the rim 10 in a wider range at the interior and the exterior of the rim 10, this is advantageous in terms of rigidity and enables an increase in natural frequency.

In addition, when comparing the conventional general steel wheel with the styled steel wheel of the present invention under the condition of the same weight (of 9.1 kg), it could be appreciated that the conventional general steel wheel (see FIG. 1A) has a rim mode natural frequency of 157 Hz, whereas the styled steel wheel of the present invention (see FIG. 3) is increased in natural frequency to 254 Hz as a result of setting a height difference in the wheel axis direction between the weld zones of the disc 20 and the rim 10, i.e. between the end 21a of each disc spoke 21 and the vent hole position end 22a.

In addition, the effective rim rigidity is 2,358 kgf/mm, which is about 2.6 times of that of the conventional general steel wheel.

As described above, the styled steel wheel of the present invention is increased in natural frequency than the conventional general steel wheel under the condition of the same weight, thereby advantageously achieving improved road noise reduction performance and increased rigidity as compared to the conventional general steel wheel.

Of course, the styled steel wheel of the present invention including the spoke-shaped disc 20 is capable of achieving design freedom to enable various designs of the spokes 21, thus advantageously achieving superior design to the general steel wheel.

In addition, although a conventional styled steel wheel, acquired by changing a disc shape of the general steel wheel to a spoke shape, may achieve an increased natural frequency and rigidity as compared to the general steel wheel, the conventional styled steel wheel requires a relative great disc thickness, thus suffering from an excessive wheel weight.

On the other hand, in the improved styled steel wheel of the present invention, the spoke-shaped disc 20 is manufactured by forming a single panel via pressing. In particular, to allow the disc 20 to support the rim 10 in a wide range at the interior and the exterior of the rim 10, the disc 20 is manufactured such the weld zones between the disc 20 and the rim 10, i.e. the weld zone between each spoke 21 and the rim 10 and the weld zone between each vent hole position end 22a and the rim 10 have a height difference in the wheel axis direction and the rim 10, and the disc 20 are welded to each other to indicate the height difference upon bonding. In this way, it is possible to increase a required natural frequency and rigidity without an increase in disc thickness.

As is apparent from the above description, with a wheel for vehicles and a method for manufacturing the same, the present invention has effects of achieving superior design to a general steel wheel owing to design freedom obtained by a spoke-shaped disc, of achieving an increased natural frequency and rigidity while having the same level of a disc thickness and weight as the general steel wheel, and of achieving noise reduction performance owing to a height difference in the wheel axis direction between weld zones of a disc and a rim, i.e. between a spoke and a vent hole position end.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wheel for vehicles, comprising:
   a rim coupled to a tire; and
   a spoke-shaped disc including a spoke and a vent hole, the spoke-shaped disc being coupled to a side surface of the rim to support the rim,
   wherein a first coupling zone between the spoke of the spoke-shaped disc and the rim and a second coupling zone between a portion of the spoke-shaped disc formed with the vent hole and the rim have a height difference in a wheel axis direction, to allow the spoke-shaped disc to support the rim at an interior and an exterior of the rim, and
   wherein the first coupling zone between the spoke of the spoke-shaped disc and the rim and the second coupling zone between the portion of the spoke-shaped disc formed with the vent hole and the rim have a height difference in a radial direction of the spoke-shaped disc.

2. The wheel of claim 1, wherein an end of the spoke of a peripheral portion of the spoke-shaped disc is coupled to an exterior position of the rim, and a vent hole position end, corresponding to an end of the portion formed with the vent hole, of the peripheral portion of the spoke-shaped disc is coupled to an interior position of the rim.

3. The wheel of claim 2, wherein the end of the spoke and the portion formed with the vent hole are coupled, via welding, to positions of the rim having a height difference in the wheel axis direction.

4. The wheel of claim 1, wherein an end of the spoke and the portion formed with the vent hole are coupled, via welding, to positions of the rim having a height difference in the wheel axis direction.

* * * * *